United States Patent
Rahm

(10) Patent No.: US 8,002,098 B2
(45) Date of Patent: Aug. 23, 2011

(54) TORQUE RESPONSIVE RELEASE CLUTCH FOR A POWER NUTRUNNER

(75) Inventor: Erik Roland Rahm, Upplands Väsby (SE)

(73) Assignee: Atlas Copco Tools AB, Nacka (SE)

( * ) Notice: Subject to any disclaimer, the term of this patent is extended or adjusted under 35 U.S.C. 154(b) by 691 days.

(21) Appl. No.: 12/085,020

(22) PCT Filed: Nov. 17, 2006

(86) PCT No.: PCT/SE2006/001303
§ 371 (c)(1),
(2), (4) Date: May 14, 2008

(87) PCT Pub. No.: WO2007/058595
PCT Pub. Date: May 24, 2007

(65) Prior Publication Data
US 2009/0120248 A1    May 14, 2009

(30) Foreign Application Priority Data
Nov. 17, 2005   (SE) ...................... 0502522

(51) Int. Cl.
*B25B 23/155* (2006.01)
*B25B 23/14* (2006.01)
*B25B 23/157* (2006.01)

(52) U.S. Cl. .... 192/56.61; 81/473; 173/178; 192/89.27; 192/108; 464/39

(58) Field of Classification Search ............... 192/56.6, 192/56.61, 56.62, 56.55, 56.56, 56.57, 89.21, 192/89.27; 464/39; 173/178; 81/473, 476, 81/58.3
See application file for complete search history.

(56) References Cited

U.S. PATENT DOCUMENTS
2,697,370 A * 12/1954 Brooks ................... 81/58.3
4,883,130 A    11/1989 Dixon
(Continued)

FOREIGN PATENT DOCUMENTS
JP    2000-254873 A    9/2000

*Primary Examiner* — Rodney H Bonck
(74) *Attorney, Agent, or Firm* — Holtz, Holtz, Goodman & Chick PC

(57) ABSTRACT

A torque responsive release clutch intended for a power nutrunner and comprises a driving clutch half (11) and a driven clutch half (10) coupled to each other for torque transfer by means of axially directed teeth (16, 17), wherein one of the clutch halves is axially movable between an engagement position and a release position against the action of a bias spring (13). Each one of the teeth (16) of one of the clutch halves (10) has a substantially prismatic shape and extends axially from a base portion (19) to a top portion (20) and comprises two surfaces (22, 23) which form between them a ridge (25). The base portion (19) of the tooth (16) has a radial extent from an inner diameter ($d_1$ to an outer diameter ($d_2$), and the ridge (25) extends from the inner diameter ($d_1$ at the base portion (19) to the outer diameter ($d_2$) at the top portion (20). The contact points between teeth (17) of the driving clutch half (11) and the teeth (16) of the driven clutch half (10) are arranged to travel along the ridge (25) during the release sequence of the clutch, whereby the torque coupling of the clutch is transferred via a smaller diameter at the beginning of the release sequence than at the end thereof. This means that the dynamic torque additive emanating from the inertia of the movable clutch half at the beginning of the release movement is added to a torque level that is lower than that at the end of the release sequence.

3 Claims, 1 Drawing Sheet

U.S. PATENT DOCUMENTS 6,062,114 A * 5/2000 Rahm .............................. 81/473
6,076,438 A * 6/2000 Rahm .............................. 81/473
6,085,849 A * 7/2000 Scigliuto ....................... 173/178
2005/0247459 A1 11/2005 Voigt et al.

* cited by examiner

TORQUE RESPONSIVE RELEASE CLUTCH FOR A POWER NUTRUNNER

This application is a U.S. National Phase Application under 35 USC 371 of International Application PCT/SE2006/001303 filed Nov. 17, 2006.

FIELD OF THE INVENTION

The invention relates to a torque responsive release clutch intended for a power nutrunner and comprising a driving clutch half and a driven clutch half coupled to each other by axially directed torque transferring teeth, wherein one of the clutch halves is axially movable during the clutch release sequence.

BACKGROUND OF THE INVENTION

A problem concerned with release clutches of this type is the difficulty to bring down the actual difference in output torque when tightening so called hard and soft screw joints. One reason why such differences occur is the dynamic addition to the set output torque caused by the moving parts of the clutch itself. During the very start of the release sequence of the clutch there is an acceleration of the movable clutch half in the release direction, which means that the inertia of the moving clutch half adds a dynamic force to the clutch engagement and, accordingly, to the output torque of the nutrunner. This is particularly pronounced when tightening hard screw joints, because in these cases the retardation of the driven clutch half is very abrupt which causes a very fast acceleration of the movable clutch half in the release direction. The harder screw joint and the faster the retardation of the driven clutch half the higher the dynamic torque addition to the set release torque level.

SUMMARY OF THE INVENTION

The main object of the invention is to create a torque responsive release clutch by which the dynamic addition to the set release torque level is considerably reduced as is the so called mean shift, i.e. the difference in the obtained output torque when tightening hard and soft screw joints.

According to one aspect of the invention, a torque responsive release clutch for a power nutrunner includes a first clutch half and a second clutch half, both provided with axially extending teeth for torque transfer between the clutch halves. Either one of the first and second clutch halves is axially movable between an engagement position and a release position, and a spring unit is arranged to bias the movable clutch half towards the engagement position. Each one of the teeth on the first clutch half has a substantially prismatic shape and extends from a base portion to a top portion, and the base portion has a radial extent between an inner diameter and an outer diameter. Each one of the teeth on the first clutch half includes a ridge extending from the base portion at the inner diameter to the top portion at the outer diameter. And each one of the teeth of the second clutch half is arranged to engage a corresponding tooth of said first clutch half at an engagement point that travels along the ridge of the corresponding tooth of the first clutch half when the movable clutch half is displaced from the engagement position to the release position, whereby the engagement point between each tooth of the first clutch half and each tooth of the second clutch half is displaced from the inner diameter to the outer diameter during the clutch release sequence.

Further characteristic features and advantages of the invention will appear from the following specification and claims.

A preferred embodiment of the invention is described below with reference to the accompanying drawing.

DETAILED DESCRIPTION

Figure 1:
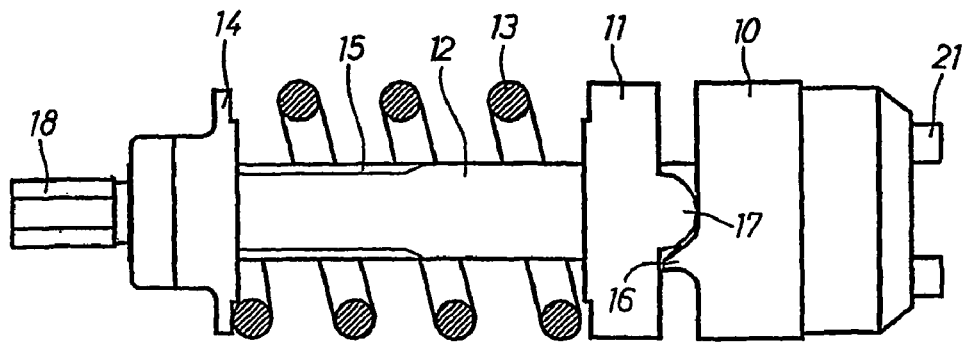
FIG. 1 shows a side view of a release clutch according to the invention.
Figure 2:
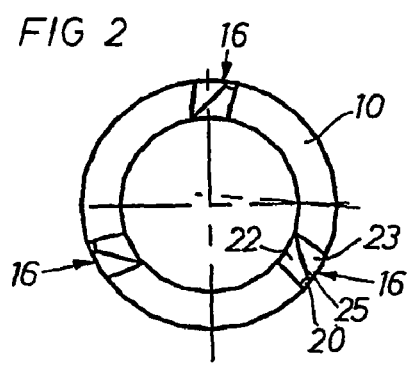
FIG. 2 shows an end view of one of the clutch halves.
Figure 5:
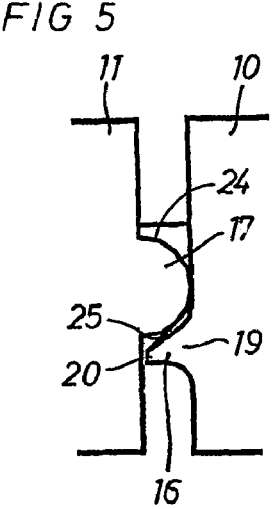
FIG. 5 shows a detail view of the coupling teeth in torque transferring engagement.
Figure 3:
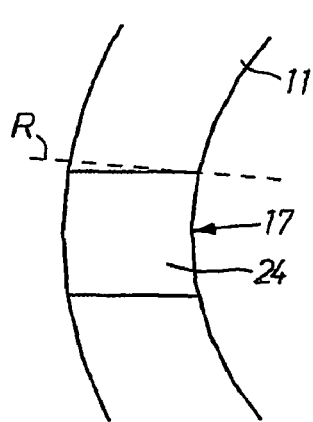
FIG. 3 shows, on a larger scale, a coupling tooth of the clutch half in FIG. 2.

The clutch illustrated in the drawings is intended for a power nutrunner to limit the output torque of the nutrunner. The clutch is an overriding release type clutch which is set to release at a desired torque level. The clutch comprises a first driven clutch half 10 provided with axial dogs 21 for connection to an output shaft directly or via a reduction gearing (not shown), and a second driving clutch half 11 connected to the nutrunner motor (not shown). The driving clutch half 11 is supported on and rotatively locked but axially displaceable relative to a spindle 12, and a spring 13 is arranged to exert an axial bias force on the driving clutch half 11 for establishing a coupling with the driven clutch half 10. A spring support 14 is movably carried on the spindle 12 via a thread 15 for adjusting the bias force on the driving clutch half 11 and, thereby, the release torque level of the clutch. The spindle 12 is provided with a hexagonal end portion 18 for connection to a motor spindle.

The driving clutch half 11 is provided with three axially directed coupling teeth 17 arranged to engage three coupling teeth 16 on the driven clutch half 10 to, thereby, transfer a driving torque between the two clutch halves. In the illustrated example each one of the coupling teeth 17 of the driving clutch half 11 has a half cylindrical outer surface 24 extending in the radial direction of the clutch. At release of the clutch the driving clutch half 11 is axially displaced against the bias force of the spring 13 until the teeth 17 pass over the tops of the teeth 16 of the driven clutch half 10. Then the clutch half 11 is returned to its starting position to re-establish the torque transferring coupling between the teeth 16 and 17.

Each one of the coupling teeth 16 of the driven clutch half 10 is of a prismatic shape and extends axially between a wide base portion 19 and a narrow top portion 20. The base portion 19 extends radially between an inner diameter $d_1$ and an outer diameter $d_2$, and the narrow top portion 20 is located substantially at the outer diameter $d_2$. Moreover, each tooth 16 of the driven clutch half 10 comprises a first surface 22 which extends substantially in a plane tangential to the rotation direction of the clutch and leans outwardly from the inner diameter $d_1$ at the base portion 19 to the outer diameter $d_2$ at the top portion 20. Each tooth 16 also comprises a second surface 23 which extends in a substantially radial plane from the base portion 19 to the top portion 20 and leans forwardly in the rotation direction of the clutch.

The two surfaces 22, 23 form between them a ridge 25 which extends from the inner diameter $d_1$ at the base portion 19 to the outer diameter $d_2$ at the top portion 20. This ridge 25, which extends substantially diagonally across the tooth 16, is intended to be engaged by a corresponding tooth 17 of the driving clutch half 11 to transfer torque. This is obtained in that there is an angle provided between the surface 23 and the surface 24 of the corresponding tooth 17 of the driving clutch half 11 guaranteeing that there will be no full contact between the surface 23 and the surface 24 of the tooth 17 of the other clutch half. Instead, the surface 24 of the tooth 17 will engage the ridge 25 only.

Due to the fact that the ridge 25 extends between the inner diameter $d_1$ at the base portion 19 and the outer diameter $d_2$ at the top portion 20 the contact point between the tooth 16 and the tooth 17 will successively move from the inner diameter $d_1$ to the outer diameter $d_2$ as the coupling teeth 16,17 slide relative to each other at relative rotation of the clutch halves 10,11 during the release sequence of the clutch. Since the torque transfer takes place at a smaller diameter at the beginning of the release sequence than at the end thereof the transferred torque is lower at the beginning than at the end of the release sequence. This means in turn that the dynamic additive to the output torque due to clutch inertia forces which are generated at the start of the axial movement of the movable driving clutch half 11 will add to a lower torque level than the desired final release torque level of the clutch. The result is that the clutch inertia influence on the final release torque level is substantially reduced or fully avoided.

Figure 4:
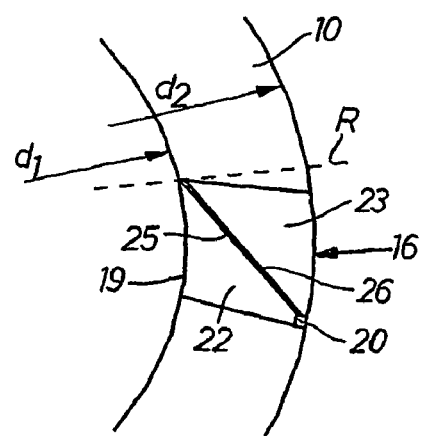
FIG. 4 shows, on a larger scale, a coupling tooth of the other clutch half.

The co-operation between a tooth 17 of the driving clutch half 11 and the ridge 25 of each tooth 16 of the driven clutch half 10 is guaranteed by providing an angle between the surface 23 of the tooth 16 and the surface 24 of the tooth 17. This could be accomplished either by having the surface 23 formed with an angle relative to the radial direction R of the clutch (see FIG. 4), whereas the surface of the tooth 17 is radial, or by having the tooth 17 forming an angle relative to the radial direction R while the surface 23 is radial, or having both surfaces forming angles relative the radial direction R of the clutch.

A relative angle of about five degrees has proven to be suitable to obtain a favourable contact between the ridge 25 and the tooth 17. A too small relative angle would make it uncertain whether the surface 24 of the tooth 17 actually engages the ridge 25 instead of the entire surface 23, and a too large relative angle would result in a very small engagement area between the teeth 16,17, thereby causing a undesirable mechanical wear of the ridge 25 during the release sequences. A moderate relative angle between the surface of the tooth 17 and the surface 23 of the tooth 16 will facilitate for the tooth 17 to accomplish through frictional wear a limited narrow engagement surface 26 alongside the ridge 25 to thereby reduce the contact pressure between the teeth 16,17 as well as the mechanical wear of the teeth 16,17. This engagement surface, however, should be narrow enough to guarantee that the engagement point between the coupling teeth 16,17 actually travels from the inner diameter $d_1$ at the beginning of the release sequence to the outer diameter $d_2$ at the end of the release sequence.

It is to be understood that the embodiments of the invention are not limited to the above described example but can be freely varied within the scope of the claims. Accordingly, the number of coupling teeth on the clutch halves is not restricted to three, and the location of the prismatic teeth does not have to be at the driven clutch half.

The invention claimed is:

1. A torque responsive release clutch for a power nutrunner, comprising:
   a first clutch half and a second clutch half, both provided with axially extending teeth for torque transfer between the clutch halves,
   wherein:
   either one of said first and second clutch halves is axially movable between an engagement position and a release position,
   a spring unit is arranged to bias the movable clutch half towards the engagement position,
   each one of the teeth on said first clutch half has a substantially prismatic shape and extends from a base portion to a top portion, said base portion having a radial extent between an inner diameter and an outer diameter,
   each one of the teeth on said first clutch half comprises a ridge extending from said base portion at said inner diameter to said top portion at said outer diameter, and
   each one of the teeth of said second clutch half is arranged to engage a corresponding tooth of said first clutch half at an engagement point that travels along said ridge of said corresponding tooth of said first clutch half when the movable clutch half is displaced from the engagement position to the release position, whereby the engagement point between each tooth of said first clutch half and each tooth of said second clutch half is displaced from said inner diameter to said outer diameter during a clutch release sequence.

2. The torque responsive release clutch according to claim 1, wherein said prismatic shape includes a first surface extending substantially in a plane tangential to a clutch rotation direction and leaning outwards from said inner diameter at said base portion to said outer diameter at said top portion, and a second surface extending in a plane substantially radial to the clutch rotation direction from said base portion to said top portion and leaning forwards in the clutch rotation direction wherein said first and second surfaces form said ridge between them.

3. The torque responsive release clutch according to claim 2, wherein said second surface extends in a plane differing from the radial direction of the clutch by at least two degrees.

* * * * *